May 24, 1949.　　　G. C. SCOTT ET AL　　　2,471,170
TREATMENT OF VEGETABLES
Filed Feb. 15, 1943　　　2 Sheets-Sheet 1
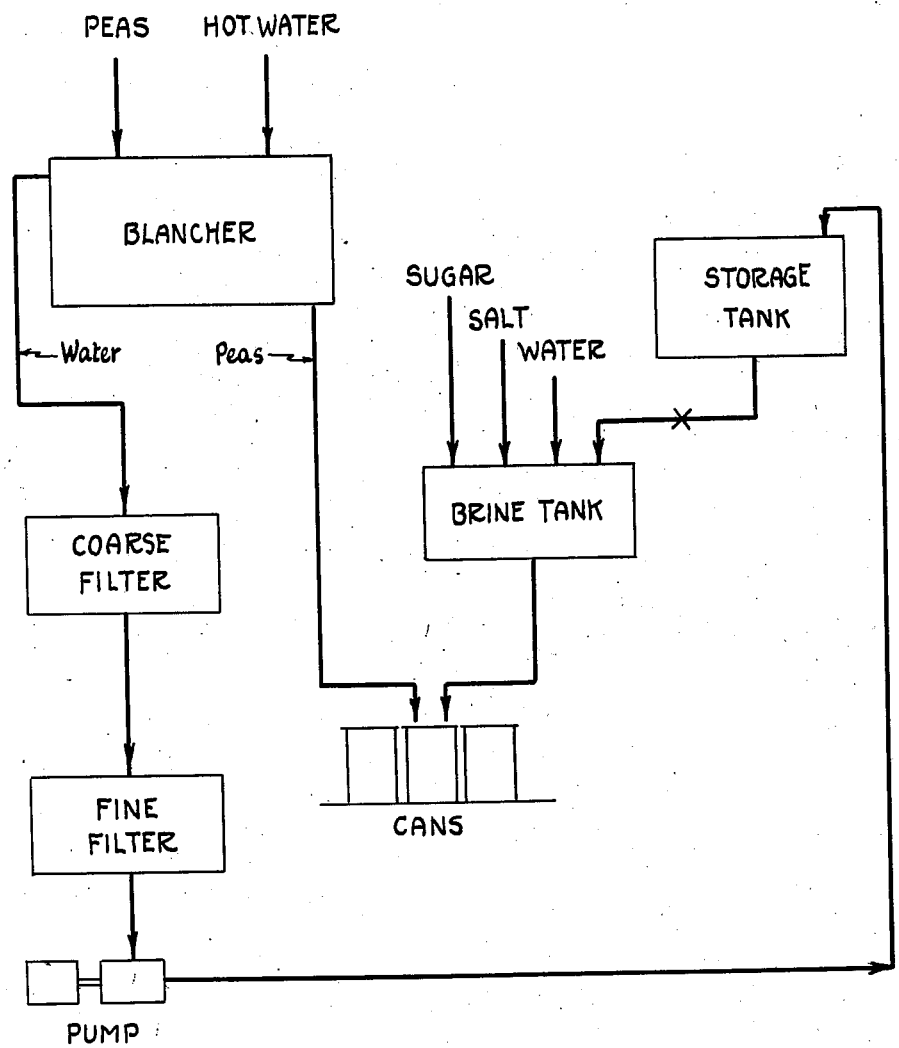

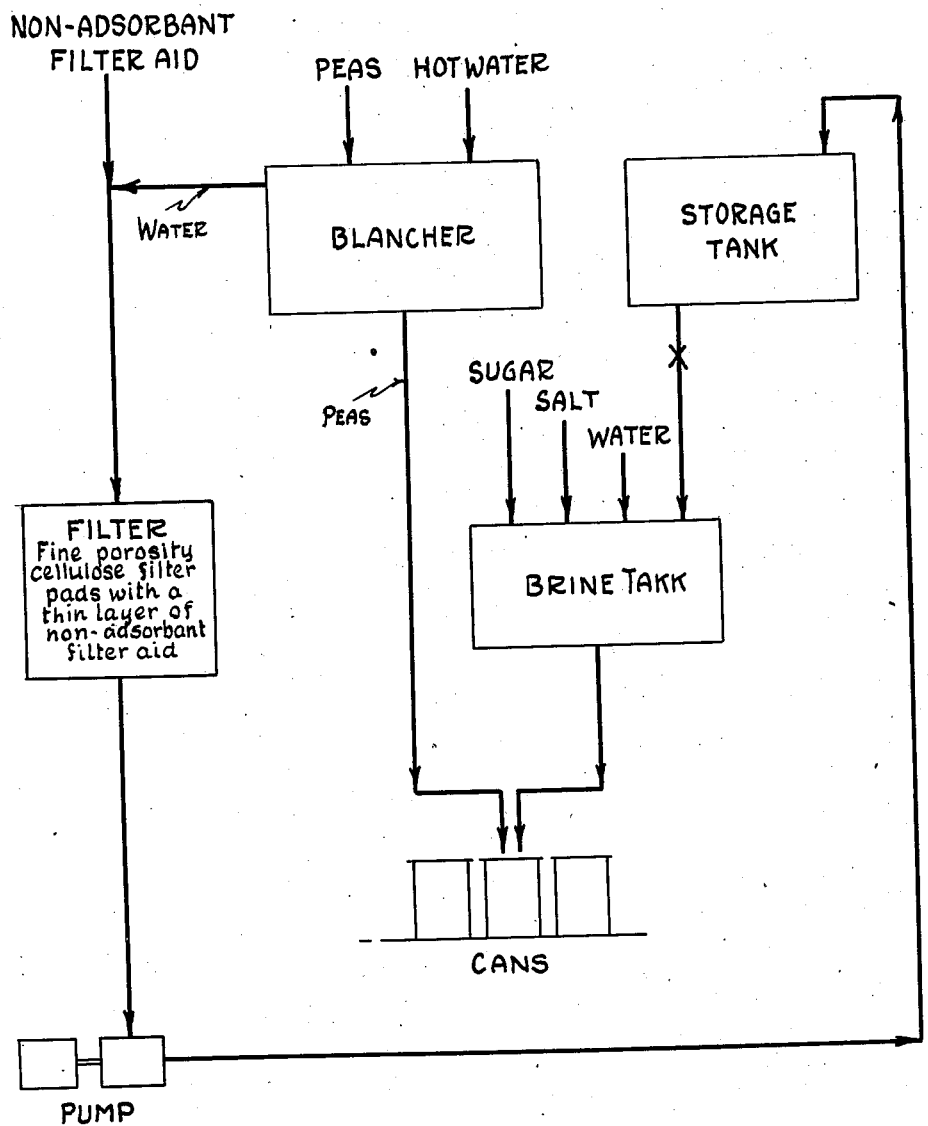

Patented May 24, 1949

2,471,170

UNITED STATES PATENT OFFICE 2,471,170

TREATMENT OF VEGETABLES

George C. Scott, Le Sueur, Minn., and Robert E. Oltman, deceased, late of Le Sueur, Minn., by John T. Peterson, administrator, Le Sueur, Minn.

Application February 15, 1943, Serial No. 475,984

11 Claims. (Cl. 99—186)

This invention relates to the treatment of peas and other vegetables for the canning thereof.

In the canning of vegetables, and particularly peas, a blanching treatment is employed in which the peas or other vegetables are subjected to washing with water at an elevated temperature. While this treatment is necessary, it has been found that there is a considerable loss of vitamins, minerals, and flavor from the peas or other material. As a result of analyses on peas and other materials before and after the blanching treatment, it was found that the blanching of peas, for instance, in hot water (200° F.) for 5 to 7 minutes resulted in an extraction from the peas of 30 to 40 per cent of the vitamin C content, other water soluble vitamins, and essential mineral nutrients such as iron and phosphorus.

The principal object of the present invention is to provide a method for the canning of peas and other vegetable materials in which the vitamins and essential mineral nutrients normally lost are recovered.

Another object of this invention is to provide a process for the treatment of peas and other vegetables preliminary to the canning thereof in which the water utilized in blanching the same is converted into a brine utilized in the canning procedure.

A further object of this invention is to provide a method of canning peas and other vegetables which comprises washing the vegetables, purifying the wash water, and introducing it with washed vegetables into cans.

Still another object of this invention is to provide a method of canning peas and other vegetables in which the peas and other vegetables are subjected to a blanching treatment with hot water in which a portion of the vitamin and mineral content is extracted, purifying the water, converting the water into a canning brine and introducing the brine into peas or other vegetables into cans.

Yet another object of this invention is to fortify the brine used in the canning of peas with water from the blanching operation which contains vitamins and minerals removed from the peas in blanching.

It is also an object of this invention to provide a method of treating blancher water to remove bacteria and render it suitable for use in forming a canning brine.

With these and other objects in view, the present invention resides in the steps and procedures hereinafter set forth and illustrated in the accompanying drawings.

In the drawings:

Figure 1 is a flow sheet illustrating one form of process in accordance with the present invention; and Figure 2 is a flow sheet illustrating an alternate filtration step which may be employed in connection with the process.

As hereinbefore mentioned, in the blanching of peas, for instance, in hot water (200° F.) for 5 to 7 minutes an extraction from the peas of substantial quantities of vitamin C and other water soluble vitamins and the essential mineral nutrients iron and phosphorous is effected. In order to recover these extracted vitamins, the present invention contemplates utilizing the blanching water in the canning of the peas. In other words, the blanching water is treated to convert the same into a canning brine which is added to the peas or other vegetables in the canning operation.

Laboratory experiments were conducted in which peas were blanched and then canned using, in one case, a normal brine and in another case, a brine made up of blancher water reclaimed according to the process herein disclosed. Determinations by several methods were then made in both lots for various vitamin and mineral constituents and the following table represents the increase in vitamin and mineral content of the peas canned using our reclaimed blancher water over those canned in a normal brine. The values represented are average for the various determinations:

| | Average values, percent |
|---|---|
| Vitamin A as carotene | No increase |
| Vitamin B₁ (thiamine) | 13 |
| Vitamin B₂ (riboflavin) | 29 |
| Niacin (nicotinic acid) | 49 |
| Vitamin C (ascorbic acid) | 28 |
| Ash | 6.2 |
| Calcium | 6.6 |
| Iron | 16.2 |
| Phosphorus | 11.3 |

Brine=60% of the weight of peas.

These experiments were carried out using available laboratory equipment and it is believed that the values for the vitamins would be increased somewhat in commercial installations where the material could be handled more quickly and more protected from contact with the air.

Since the brine used in these experiments consisted only of blancher water, the values given in the above table will be somewhat higher than those resulting from commercial practice. As commercially used, the blancher water will usually comprise not much more than 75% of the brine used, since a small amount of blancher water will suffice for many times its weight of peas. However, the values here given serve as an indication of the vast improvement in the canned product.

Before the blancher water can be added to the peas, some procedure must be followed to remove the bacteria and other undesired materials therefrom without disturbing the vitamin and mineral content thereof. The primary purpose of the blanching of peas, for instance, is to give them a good hot water washing and remove adhering dirt and bacteria, inactivate enzymes, and expel air. Bacteriological analyses reveal that the overflow water from the blanching operation contains more than two million bacteria per cubic centimeter. Obviously, if this amount of bacteria were introduced into cans of peas, a 100 per cent spoilage would result.

In accordance with the present invention, the blanching water which is to be utilized for forming the brine to be added to the peas or other vegetables is subjected to a treatment to remove turbidity and suspended sediments from the water as well as bacteria which are likely to cause spoilage of the canned product. One method of treating the blanching water to render it suitable for use in the preparation of a canning brine is to effect filtration of the water. This clarifying of the blancher water may be effected either by vacuum or pressure filtration, carried out in one or more steps, centrifugal filtration, centrifugation or by sedimentation processes. Because of its commercial practicability, we prefer to use a system of pressure filtration carried out in one or more steps depending upon conditions.

As an example of a two stage filtration, the water overflowing from the blancher may be passed first through a relatively coarse filter to remove the coarser sediments present as turbidity, then the partially clarified water is passed through a second filter composed of a diatomaceous earth, such as one known commercially as "super-cell," to remove the bacteria present in the water. These filtration steps do not remove the vitamin and mineral content but do clarify and purify the water from bacteria to a sufficient extent to enable its satisfactory use in making up canning brine.

As an alternate method of filtration which we have found to be highly efficient under certain conditions, we employ a single filtration step wherein a filter aid, such as the diatomaceous earth mentioned above, is suspended in the blancher water prior to passing it through a cellulose filter pad of fine porosity. A thin layer of this filter aid may also be placed above the filter pads. By such use of a filter aid, commercial porosities of filter pads may be employed to give a good flow of liquid without clogging and yet efficiently remove the sediment and bacteria in the water without removing the vitamins and mineral nutrients. It is to be noted that care must be taken in the selection of a filter aid not to employ one which has adsorptive properties, such as for instance, activated carbon, which will also remove the vitamins.

Referring to the drawing accompanying this application, it will be noted that in carrying out an operation in accordance with the present invention peas and hot water are introduced into the blancher. The blanched peas are passed from the blancher into cans or other containers into which they are to be packed.

In one method of operation, illustrated in Figure 1, water flowing from the blancher, and which contains a large quantity of vitamins and mineral nutrients, is first passed through a coarse filter in which the turbidity and coarser sediment is removed, and then is passed through a fine filter which serves to remove bacteria.

The purified blancher water is then pumped into a storage tank from which it is withdrawn as required and discharged into a brine tank in which it is mixed with sugar, salt, and fresh water to form a canning brine having desired properties. It has been found that the flow of water from pea blancher, for instance, is not sufficient in proportion to the quantity of peas blanched to satisfy all the brine requirements. It is for this reason, that additional fresh water must be added to the brine tank. However, substantially all of the vitamins and minerals, which are now being discharged as waste after extraction from the peas or other vegetables, can be replaced in the canned product.

In addition to the vitamins and minerals present in the blancher overflow water, the water also contains approximately one per cent sugar. By recovering the sugar in the blancher water, this makes it possible to form the canning brine by using approximately 25 per cent less sugar than would be required if the brine were made from fresh water and yet obtain the same sweetness of the canned product. This is based upon the assumption that the pea brine as introduced into the cans contains approximately 4 per cent sugar. Under present conditions, it will be realized that this is one of the important features of the present invention.

Apart from the recovery of sugar, dissolved vitamins, and minerals in the blancher water, it has been found that this water, after removal of bacteria and undesirable sediment, has a distinctively pleasing pea flavor. Peas canned with the clarified and purified blancher water, as compared with brine formed from fresh tap water, have a better pea flavor, are somewhat stronger, and are less bland than peas canned in brine made from ordinary tap water. In other words, the canned product is not only more nutritious from the standpoint of vitamins and minerals, but has a better flavor and results in a saving of about 25 per cent of sugar.

As an alternate method of carrying out our reclaiming process which is illustrated in Figure 2 of the drawings, a single filtration step is employed. Here the filter has a porosity sufficiently fine to not only remove the turbidity from the water but also filter out the contained bacteria. Such a filter, under ordinary conditions, tends to clog quickly with solids and give a rate of flow of the liquid too slow to be commercially practicable. The rate of flow may be increased by the addition of a layer of a filter aid, such as diatomaceous earth, above the filter pads. We have found, however, that by employing a very thin layer of this non-adsorbent filter aid in connection with the filter pads and then suspending an additional amount of such filter aid in the blancher water prior to its entrance to the filter, optimum results were obtained. Not only does such a filter give a good rate of flow but the filtered water is practically free of bacteria and retains substantially all of its vitamin and mineral content.

From the foregoing description, it will be appreciated that the present invention provides an economical process for the canning of peas and other vegetables in which the vitamin and mineral contents normally lost are retained, and in which a canned product is produced which has better flavor, and is more economically put up than heretofore.

It is claimed:

1. In the canning of vegetables the steps of washing vegetables, removing suspended impurities from the wash water, and introducing the purified water into cans with the washed vegetables.

2. In the canning of vegetables the steps of washing vegetables under conditions capable of extracting desirable vitamins and mineral constituents, removing suspended impurities from the wash water without substantial loss of the desirable constituents therefrom, and introducing the so treated wash water into the cans with the washed vegetables.

3. In the canning of peas the steps of blanching the peas with water, removing suspended impurities from the overflow blancher water, and introducing the purified water into cans with the blanched peas.

4. In the canning of peas the steps of blanching the peas with hot water under conditions resulting in the consequent extraction of desired vitamin and mineral constituents, removing from the waste water discharged from the blanching operation bacteria capable of causing spoilage of peas, and introducing the so treated blancher water into cans with the peas.

5. In the canning of peas the steps of blanching the peas with hot water under conditions resulting in the consequent extraction of desired vitamin and mineral constituents, removing from the waste water discharged from the blanching operation bacteria capable of causing spoilage of peas, forming a canning brine from the so treated water and adding the brine to the peas.

6. In the canning of vegetables the steps of washing vegetables, filtering the wash water to remove turbidity, sediment and bacteria, and introducing the filtered water into cans with the washed vegetables.

7. In the canning of vegetables the steps of washing vegetables under conditions capable of extracting desirable vitamins and mineral constituents removing suspended impurities from the wash water, without loss of the desirable constituents, adding sugar and salt to the purified water, and adding the brine thus formed to the washed vegetables to be canned.

8. In the canning of vegetables the steps of washing the vegetables to remove surface impurities under conditions capable of removing a portion of the vitamin and mineral constituents from the vegetables into the wash water, passing the wash water through a filtering medium to remove the impurities therefrom while retaining the vitamin and mineral content of the water, and then introducing the so filtered wash water into cans with the washed vegetables.

9. In the canning of vegetables the steps of washing the vegetables to remove surface impurities under conditions capable of removing a portion of the vitamin and mineral constituents from the vegetables into the wash water, passing the wash water through a non-adsorbing filtering medium to remove the impurities therefrom while retaining the vitamin and mineral content of the water, and then introducing the so filtered wash water into cans with the washed vegetables.

10. In the canning of vegetables the steps of washing the vegetables to remove surface impurities under conditions capable of removing a portion of the vitamin and mineral constituents from the vegetables into the wash water, passing the wash water through a filtering medium in the presence of a non-adsorbing filter aid to remove the impurities therefrom while retaining the vitamin and mineral content of the water, and then introducing the so filtered wash water into cans with the washed vegetables.

11. In the canning of vegetables the steps of washing the vegetables to remove surface impurities under conditions capable of removing a portion of the vitamin and mineral constituents from the vegetables into the wash water, suspending a non-adsorbing filter aid in the wash water, passing the wash water together with the suspended filter aid to a filtering stage to remove the impurities therefrom while retaining the vitamin and mineral content, and then introducing the so filtered wash water into cans with the washed vegetables.

GEORGE C. SCOTT.
JOHN T. PETERSON,
*Administrator of the Estate of Robert E. Oltman, Deceased.*

REFERENCES CITED

The following references are of record in the file of this patent:

UNITED STATES PATENTS

| Number | Name | Date |
|---|---|---|
| 1,421,750 | Willison | July 4, 1922 |
| 1,434,663 | Artega | Nov. 7, 1922 |
| 1,750,467 | Hansen | Mar. 11, 1930 |
| 1,756,549 | Hansen | Apr. 29, 1930 |
| 1,934,810 | Mazzola | Nov. 14, 1933 |

OTHER REFERENCES

Canning and Preserving, by Duckwall, vol. 1, 1905, pages 353 and 354.